(12) United States Patent
Harvey et al.

(10) Patent No.: US 11,889,818 B2
(45) Date of Patent: *Feb. 6, 2024

(54) SOCIAL GROUP MANAGEMENT SYSTEM AND METHOD THEREFOR

(71) Applicant: Fort Supply IP, LLC, Kaysville, UT (US)

(72) Inventors: Malcolm Randall Harvey, Hyde Park, UT (US); Ian Robert Harvey, Kaysville, UT (US); Nephi Taylor Harvey, Kaysville, UT (US)

(73) Assignee: FORT SUPPLY TECHNOLOGIES, LLC, Kaysville, UT (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/468,560

(22) Filed: Sep. 7, 2021

(65) Prior Publication Data

US 2021/0400921 A1 Dec. 30, 2021

Related U.S. Application Data

(63) Continuation of application No. 12/224,755, filed as application No. PCT/US2007/063332 on Mar. 5, 2007, now Pat. No. 11,109,571.
(Continued)

(51) Int. Cl.
*A01K 29/00* (2006.01)
*G06T 7/70* (2017.01)
(Continued)

(52) U.S. Cl.
CPC .......... *A01K 29/005* (2013.01); *A01K 11/004* (2013.01); *A01K 11/008* (2013.01);
(Continued)

(58) Field of Classification Search
None
See application file for complete search history.

(56) References Cited

U.S. PATENT DOCUMENTS 6,039,688 A 3/2000 Douglas et al.
11,109,571 B2 9/2021 Harvey et al.
(Continued)

OTHER PUBLICATIONS

International Search Report and Written opinion in PCT Application No. PCT/US2007/063332 dated Sep. 11, 2007, 8 pages.
(Continued)

*Primary Examiner* — Thomas S McCormack

(57) ABSTRACT

In a method and system for managing a social group, the method includes determining a group member behavior from a member position relative to the social group, and inferring a member state from the member behavior. Spatial, spatio-temporal, and biometric data may be used. A social group management system includes an inference engine that infers a member state from the behavior of a monitored member. Another social group management method includes characterizing a first monitored member of the social group as a first discrete element; characterizing at least a second monitored member of the social group as at least a second discrete element; and determining a characteristic displacement between the first monitored member and at least the second monitored member in accordance with a discrete element method.

20 Claims, 7 Drawing Sheets

Related U.S. Application Data

(60) Provisional application No. 60/779,053, filed on Mar. 3, 2006.

(51) Int. Cl.
*A01K 11/00* (2006.01)
*G08B 21/18* (2006.01)
*G06V 40/20* (2022.01)
*G06F 18/24* (2023.01)

(52) U.S. Cl.
CPC ............ *G06F 18/24* (2023.01); *G06T 7/70* (2017.01); *G06V 40/20* (2022.01); *G08B 21/18* (2013.01); *G06T 2207/20036* (2013.01)

(56) References Cited

U.S. PATENT DOCUMENTS

| | | | |
|---|---|---|---|
| 2002/0010390 A1* | 1/2002 | Guice | G16H 50/20 600/300 |
| 2003/0139655 A1 | 7/2003 | Dodds | |
| 2004/0061606 A1 | 4/2004 | Gronvold | |
| 2004/0078390 A1* | 4/2004 | Saunders | A01K 11/008 |
| 2005/0075116 A1 | 4/2005 | Laird et al. | |
| 2005/0265272 A1* | 12/2005 | Thorstensen | A01K 29/005 370/315 |
| 2006/0267167 A1* | 11/2006 | McCain | G06K 19/0702 257/678 |

OTHER PUBLICATIONS

International Preliminary Report an Patentability in PCT Application No. PCT/US2007/063332 dated Dec. 2, 2008, 11 pages.

Non-Final Office Action in U.S. Appl. No. 12/224,755 dated Jan. 12, 2021, 12 pages.

Notice of Allowance in U.S. Appl. No. 12/224,755 dated Jul. 26, 2021, 10 pages.

\* cited by examiner

SOCIAL GROUP MANAGEMENT SYSTEM AND METHOD THEREFOR

CROSS REFERENCE TO RELATED APPLICATION

This application is a continuation of U.S. patent application Ser. No. 12/224,755 filed Nov. 6, 2019 for Social Group Management System and Method Therefor, which is a national phase entry under 35 U.S.C. § 371 of International Patent Application PCT/US2007/063332 filed Mar. 5, 2007, designating the United States of America and published in English as International Patent Publication WO 2007/103886 A2 on Sep. 13, 2007, which claims the benefit of the filing date of U.S. Provisional Patent Application Ser. No. 60/779,053, filed Mar. 3, 2006, the disclosure of each of which are incorporated herein by reference in their entirety.

BACKGROUND OF THE INVENTION

1. Field of the Invention

This invention relates generally to social animal management systems. More specifically, the invention relates to a social group management system configured to infer a predetermined behavior from the sensed position of a social group member, relative to the social group.

2. Description of the Related Art

Livestock production can be a resource-intensive and, therefore, costly enterprise. Therefore, livestock producers seek to maximize production by quickly identifying individual behavior which may be deemed abnormal for particular social group. Abnormal behavior may be indicative of disease which, if not mitigated by timely treatment, poses a risk of impaired well-being, or even death, both to the affected individual and to the group. Early identification of abnormal behavior may lead to timely intervention, preserving the well-being of individuals and the group, and increasing a producer's efficiency, competitive advantage, and profitability. Livestock, such as cattle, typically are bred and raised in relatively open environments, where natural forces, predators, disease, injury, and theft can impair robust production and may inflict significant losses. Typically, livestock stewards monitor the well-being of livestock in a social group by direct observation. However, a typical social group may have hundreds of members dispersed over a relatively large geographic region, making accurate observations of individual social group members difficult, at best. Also, constituent members of a social group may become distressed by the advance of, and proximity to, social group stewards and other human handlers. Thus, it may be difficult to ascertain the presence, the identity, and the physical state of every social group member. In many circumstances, livestock separated from the social group, for example, by wandering, injury, disease, or theft, may not be noticed in time for recovery, treatment, or culling. For some infectious diseases or other conditions, such delays may result in extensive loss of life or substantial reductions in both the well-being of the social group and the profitability of the livestock producer. Recently, it has become desirable to trace the lineage, location, and condition of individual social group members, from birth to slaughter, with the objectives of identifying animals exposed to certain conditions and diseases, of determining the source of exposure, of improving the genetic traits, and thus profitability, of selected breeds, and of facilitating secure food production. Present systems and methods may not provide timely information about a social group and its constituent members in a manner consistent with efficient, traceable livestock production.

SUMMARY

The present disclosure provides methods and apparatus for social group management. One embodiment provides a method for management of a social group constituted of a plurality of group members, including determining a member behavior corresponding to a member of the plurality of group members, from a position of the member relative to the social group; and inferring a member state from the member behavior. The method also may include, transmitting an alert in response to the wellness state. In addition, the method may include determining a variance member behavior; inferring a distressed member state from the variance behavior; and transmitting a distress alert in response to the distress member state. Determining the member behavior further can include sensing a respective position of selected ones of the plurality of group members, determining a group spatial configuration from the respective position of the selected ones, evaluating the position of the member relative to the group spatial configuration by which a member displacement is identified, and determining the member behavior from the member displacement.

Also, inferring the member state further may include evaluating sensed biometric data received from the member; and inferring the member state from the member behavior and from the sensed biometric data. Moreover, determining the variance behavior may include selecting a member behavior model, a social group behavior model, or both; comparing the member behavior to at least one of the member behavior model, the social group behavior model, or a previous member behavior; evaluating sensed biometric data received from the member; determining the variance behavior in response to comparing the member behavior, evaluating sensed biometric data, or both.

Also disclosed is an apparatus providing a social group management system, including an inference engine configured to infer a member state corresponding to a member behavior representation of a monitored member of a social group. The system also can include a spatial behavioral mapper coupled to the inference engine and configured to produce the member behavior representation in response to sensed spatial characteristics of the monitored member, where an embodiment of the spatial behavioral mapper further includes a spatial data classifier configured to classify a monitored member displacement in a predefined observation region from the sensed spatial characteristics corresponding to the monitored member; and a behavior classifier configured to classify the member behavior representation responsive to the member displacement. In selected embodiments, the spatial behavioral mapper further includes a spatial data classifier configured to classify a monitored member displacement from the sensed spatial characteristics corresponding to the monitored member relative to sensed spatial characteristics of the social group; and a behavior classifier configured to classify the member behavior representation responsive to the member displacement.

In certain embodiments, the system includes a tag beacon sensor configured to receive an active tag beacon from the monitored member, wherein the active tag beacon includes a sensed biometric data representation of the monitored member; and a social group supervisor. The social group supervisor includes a spatial data classifier configured to classify a monitored member displacement from the sensed spatial characteristics corresponding to the monitored member relative to sensed spatial characteristics of the social group, a behavior classifier configured to classify a member behavior representation responsive to the member displacement, and the inference engine, wherein the inference engine is configured to infer a member state corresponding to a member behavior representation, a sensed biometric data representation, or both.

In certain other embodiments, the system includes a tag beacon sensor configured to receive a tag beacon group and a member tag beacon, wherein the tag beacon group is representative of a group spatial configuration of the group members, and the member tag beacon is representative of the sensed spatial characteristics of the monitored member; and a social group supervisor, including the spatial behavioral mapper configured to produce a group behavior representation in response to the group spatial configuration; and the inference engine configured to infer a member state corresponding to the member behavior representation, the group behavior representation, or both.

In still other embodiments, the active tag beacon includes a sensed biometric data representation of the monitored member; and the inference engine is configured to infer a member state corresponding to the member behavior representation, the group behavior representation, a sensed biometric data representation, or a combination thereof. The inference engine infers a distressed member state, and wherein the social group supervisor further comprises an alerter configured to transmit a distress alert in response to the distressed member state.

Another method embodiment includes characterizing a first monitored member of the social group as a first discrete element; characterizing at least a second monitored member of the social group as at least a second discrete element; and determining a characteristic displacement between the first monitored member and at least the second monitored member in accordance with a predetermined discrete element method. Selected embodiments of the method also include characterizing a characteristic member behavior corresponding to the characteristic displacement; and inferring a member state from the characteristic member behavior. In selected other embodiments, the method includes receiving selected sensed biometric data corresponding to the first monitored member; and inferring the member state from the characteristic member behavior, the selected sensed biometric data, or both.

Moreover, some embodiments also include selecting a predetermined behavior model corresponding to an expected member behavior; and inferring the member state from the characteristic member behavior, the predetermined behavior model, the selected sensed biometric data, or a combination thereof. In certain embodiments, the inferred member state is a distressed state, and the method also includes generating a distress alert in response to the distressed state; and transmitting a distress alert to a group steward.

Further, other embodiments of the method include selecting a predetermined behavior model corresponding to an expected member behavior; characterizing a characteristic member behavior corresponding to the characteristic displacement; inferring a characteristic member state from the characteristic member behavior, the predetermined behavior model, or both; conditionally generating an alert if the characteristic member state corresponds to one of a status alert or a distress alert; and transmitting the alert to a group steward on a condition of the alert being generated.

DETAILED DESCRIPTION OF EMBODIMENTS

Figure 1:
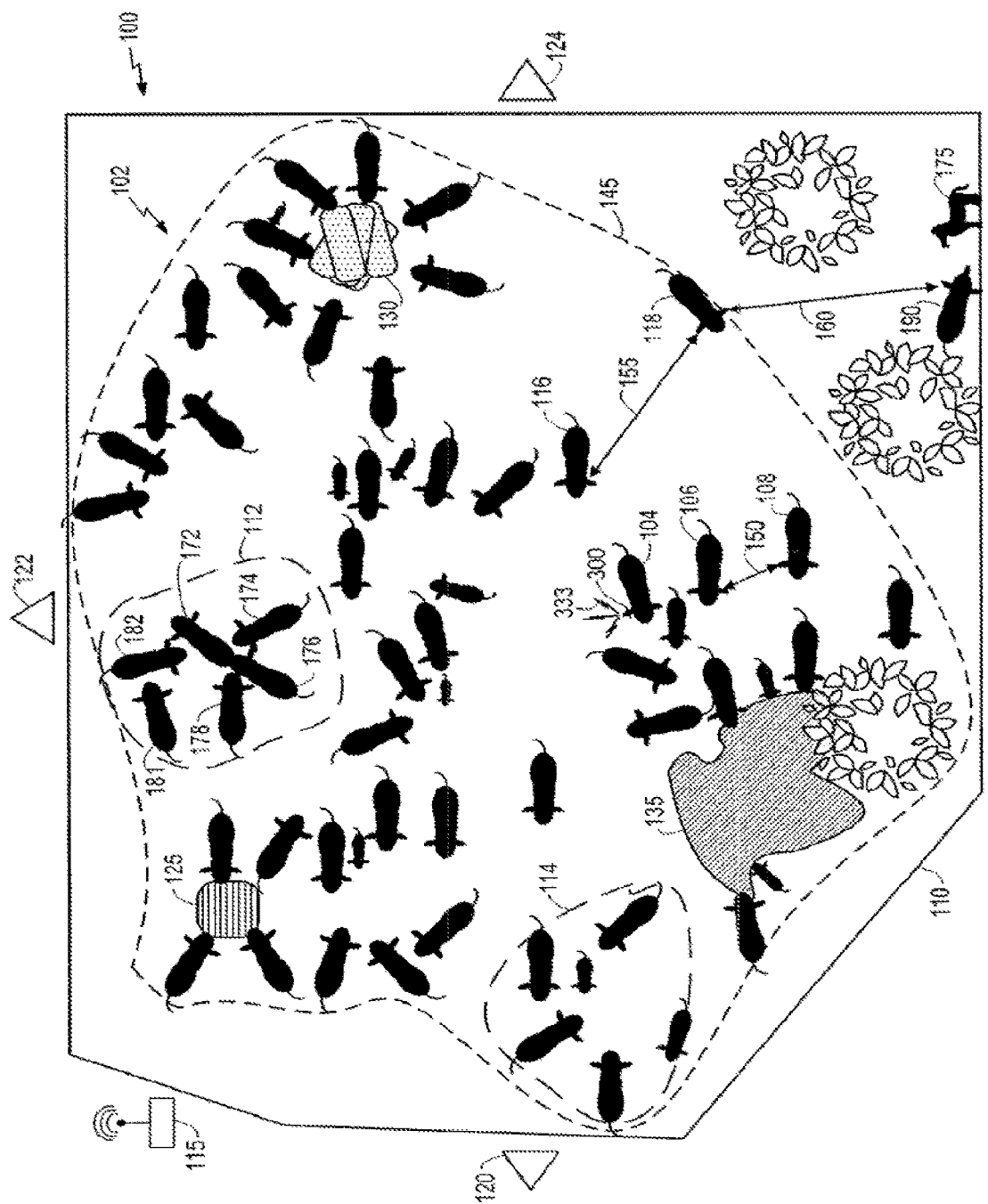
FIG. 1 is a graphical illustration of a social group management system in accordance with embodiments herein.

The present disclosure provides embodiments of a social group management system, as well as embodiments of a method for managing a social group. As used herein, social group encompasses a group of any species of animal exhibiting social behavior, including vertebrates and invertebrates. A predetermined member state of a social group member may be inferred from spatial characteristics of a social group, and of a social group member relative to the social group. Thus, it is desirable to monitor a spatial distribution of members within a social group and of a spatial displacement of a social group member relative to other social group members.

Apparatus and methods described herein may employ an empirical observation of a social group member location and a behavior to infer a member wellness state. Empirical observations may be augmented by selected a priori information, preselected models, or predetermined rules, to determine whether a social group member is positioned within an expected location, to determine whether a displacement of the social group member corresponds to a variance behavior, or to infer from the social group member location or displacement, a wellness state of the social group member, Also, empirical spatial and spatiotemporal observations may be augmented by sensed social group member biometric data, which data may be used to infer a member wellness state, to support an inference of a member wellness state otherwise determined, or to develop behavioral norms and models. In certain embodiments, breeding behavior may be inferred from sensed spatiotemporal information, including proximity of a breeding sire and breeding dam, which spatiotemporal information may be augmented by sensed biometric data, including motion data, from the sire, the dam, or both. Spatial positioning determinations disclosed herein may be augmented by, but do not require, geospatial positioning techniques, such as a CPS technique.

In general, livestock, such as cattle, are social animals that form hierarchical social group based on dominance relationships among social group members. In general, social animals form groups and frequently constrain self-interested behavior, such as survival and reproduction, by maintaining a minimal social distance and participating in group defense. Cohesiveness among social group members may vary according to species, with a social group being a hierarchically organized group of social animals tending to act in unison without planning or coordination.

Typically, interactions between social group members are influenced by social dominance, in which the behavior of one animal is inhibited or altered by the presence or threat of another animal. Many such dominance-subordinate relationships may exist within a social group, often reflecting the hierarchical structure within that social group. Every social group member has an associated, but not immutable, social group rank. A large social group may include multiple subgroups, with each constituent subgroup having a respective rank and following rank-appropriate behaviors.

Dominance is a learned and predictable relationship between a pair of animals, where one is consistently submissive to the other. Dominance relationships may develop between members, as well as between subgroups. In general, a dominance hierarchy is model that describes space sharing in a group, arranged on a priority basis that keeps intragroup friction to a minimum. Once the division of space is complete there is no further strife or challenge to the order unless, for example, a young group member reaches sexual maturity or an aged member becomes senescent.

To maintain the hierarchy, every animal in the social group must recognize each member of the group, and remember its respective dominance relationship with other social group members. A member may express its rank within a social group hierarchy, for example, by adopting a subordinate position or posture within the social group, or by maintaining a rank-appropriate distance from a nearby dominant member. Violation of a dominance protocol by a subordinate member or subgroup may evoke, at the minimum, an aggressive response by a dominant member or subgroup. Nevertheless, once established, social dominance often is maintained passively. Typically, subordinate animals avoid conflict by monitoring their spatial relationships relative to dominant animals, and moving away upon the approach of a dominant animal.

Although a significant factor, dominance relationships are not determinative of all social group behaviors, or of spatial distribution of members within a social group. In some species, aggressive behaviors characteristic of a dominance relationship may appear only during adverse conditions, or in competitive situations. Many social grouping species display complex social behaviors, in addition to dominance relationships. For example, a social group member may choose to display an appeasement behavior, such as active submission, to another social group member. Moreover, members of gregarious social grouping species also may form a spectrum of affiliative interrelationships, ranging from lifelong, mutually-dependent partnerships to functional companionships to temporary, ad-hoc affiliations. Strong partnerships may exist between related subjects as well as between unrelated subjects raised together. Examples of functional companionships include grooming and grazing companionships. Such affiliative relationships may encourage clustering of corresponding social group members. Some social group members may exhibit significant variability in temperament, social skills, and physical capabilities, further modifying the range of spatial relationships among social group members.

In addition, members of grazing social groups typically adjust their foraging behavior in response to the spatial dynamics of their environment. For example, within a foraging environment there may be points, lines, or regions of attraction or repulsion, as well as physical barriers, which may modify a spatial distribution of a social group as well as expected spatial relationships between social group members. Water, shade, and swales represent examples of natural attractors; with man-made attractors including food, mineral, and water supplements. Repulsors can include mounds, dips, unevenly illuminated areas, and toxic plants among the forage. Trees, washes, fences, and bluffs can be examples of barriers.

Consequently, social group members tend to be spatially distributed within a social group, and relative to each other, in a manner consonant with the foregoing dominance, affiliative, and individual behavioral characteristics, and environmental spatial dynamics. Inferred behavior may be derived from the sensed position of a member relative to a social group of members, in which all members typically exhibit characteristics of social behavior.

As with most social activity, behavioral norms can be established, and departures from normative behavior can be identified. Such behavioral norms may be established for a social group, a subgroup, or a social group member; and may be modified to accommodate dominance, affiliative, and individual behavioral characteristics, as well as existing environmental dynamics. Each member has predefined characteristics, which may be observed, including age, gender, or value. Each member also has individual characteristics, which may be inferred, such as health, or distress. A social group can have predefined aggregate characteristics, which may be observed and be determinable. The social group also may have one or more characteristic group states, which may be inferred. Departure from a behavioral norm may indicate an existing or emerging illness, injury, or loss, corresponding to one or more social group members. In social grouping animals such as cattle, adherence to, and departure from expected behavioral norms can be reflected in an observed spatial distribution of a social group, as well as in spatial relationships between social group members. Also, over time, such observation may allow such behavioral norms to adapt to emerging behavior patterns.

In accordance with the embodiments disclosed herein, a predetermined state of one or more of a social group member, a social group subgroup, or a social group may be inferred from a corresponding predetermined spatial distribution observed with respect to a social group, from a predetermined spatial relationship observed between social group members, or both. Non-limiting examples of a predetermined state can include a wellness state or a distressed state. Non-limiting examples of a distressed state can include a breeding state or a predation state.

Turning to FIG. 1, social group management system 100 can include a monitored social group, generally at 102, spatially distributed in a predetermined observation region 110. For the purposes of illustration, monitored social group 102 is depicted as a cattle herd. In FIG. 1, predetermined observation region 110 is shown as being delineated by a physical boundary in the form of a barrier fence, although region 110 does not need to be physically constrained. Disposed within region 110 may be one or more attractors such as mineral supplement 125, feed supplement 130, and shaded water source 135. Positions of social group members 104, alone, as a social subgroup, or as defined social group, may be determined, at least in part, by proximity to such attractors, and by the physiological needs of member 104 satiated by partaking in the resources represented thereby. In addition, region 110 may contain one or more repulsors, represented by wooded area 160, in which predator 175 may await.

Social group 102 may be constituted of a plurality of social group members, here represented by social group member 104, with some members forming determinable social group subgroups 112, 114, for example, by a dominance relationship, by an affiliative relationship, by individual behavioral characteristics, or by a combination thereof.

In general, each social group member 104 is a monitored social group member (MSM, or monitored member) bearing a respective incorporated telemetry device 300, hereinafter a tag. For the purposes of illustration, the present disclosure employs cattle as a non-limiting example of an MSM. However, an MSM may be a member of any species of animal exhibiting social behavior, including vertebrates and invertebrates.

An incorporated telemetry device is a telemetry device coupled in intimate proximity with an MSM, which may be disposed internally or externally, which may be affixed or removable, and which may be coupled permanently or impermanently. Accordingly, in certain non-limiting implementations, a tag may be clipped, pinned, or bound, to, or implanted within, an MSM corpus. In certain other non-limiting implementations, a tag may be secured to an MSM as a collar, bracelet, ring, or apparel, or as an ear tag, tail tag, or piercing stud. In yet other non-limiting implementations, a tag may be restrained or moveable within a social group member, for example, as a digestive tract bolus device, or as a miniature transponder lodged or secured within the circulatory system, bone, or soft tissue of an MSM. In ruminant MSM such as cattle, a digestive tract bolus tag may be retained indefinitely within the animal. In non-ruminant MSM, a digestive tract bolus device may pass through the MSM digestive tract and be eliminated.

Figure 3:
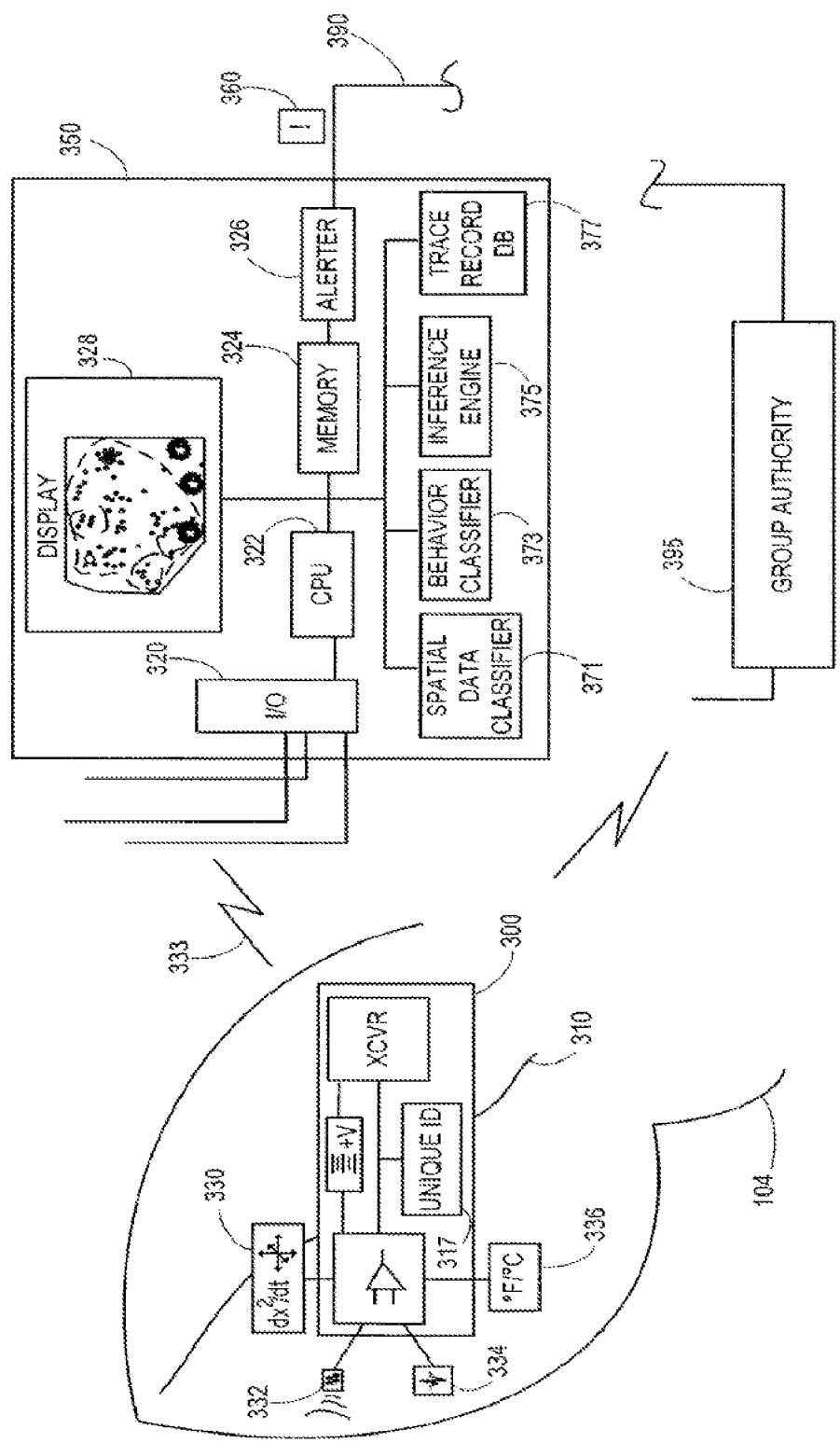
FIG. 3 is a block diagram of a telemetry device in the form of a tag, and a social group management system, used in conjunction with the social group management system illustrated in FIGS. 1 and 2.

FIG. 3 illustrates an incorporated telemetry device embodiment in tag 300, which is configured to emit tag beacon 333. Tag 300 may be configured to store therein unique ID 317 corresponding to member 104, and to impart unique ID 317 into the emitted tag beacon 333. Transceivers 120, 122, 124 can be representative of a tag beacon sensor configured to sense tag beam 333, for example over the predefined observation region 110, relative to the effective group boundary 145, or both. A sensed tag beam 333 may include spatial characteristics corresponding to a position of member 104 relative to the predefined observation region. The spatial characteristics may be included implicitly while being detected by two or more of transceivers 120, 122, 124. Tag 300 also may impart explicit location information in tag beam 333, if so configured. The tag beam sensor may convey sensed tag beam data to social group supervisor 350, which may analyze the spatial characteristics the received tag beacon 333 to determine a physical position of member 104 within region 110. Supervisor 350 may receive a tag beacon 333 from each member 104 of defined social group 102. Supervisor 350 also may be configured to receive selected tag beacons 333 from selected members 104 of defined social group 102.

Conveniently, tag 300 can be configured to convey unique ID 317 as member identification that is globally unique, or unique within a predetermined context, such as within group 102, within an aggregation of related groups 102 in a large commercial enterprise, or groups 102 identified with a defined region under the control of an administrative body. In implementations of system 100 in which tag 300 may be used to uniquely identify each member 104 of social group 102, supervisor 350 also may use an aggregation of receive tag beacons 333 to determine a roster of members 104 from social group 102 detected within region 110, within effective group boundary 145, or a combination thereof. In addition, supervisor 350 also may be configured to detect or identify an interloper, that is, a member of a social group other than group 102. In the context of a cattle herd, non-limiting examples of an interloper may include a rogue bull from a neighboring herd, or even an animal purloined from a different herd.

Social group supervisor 350 may use an aggregation of received tag beacons 333 to determine one or more of a social group location within region 110, effective group boundary 145 of defined social group 102, a spatial distribution of social group 102 within region 110, a spatial distribution of social group 102 within effective group boundary 145, or a combination thereof. In addition, supervisor 350 may use a selected aggregation of received tag beacons 333 to determine a location of one or more subgroups 112, 114 within region 110; a spatial distribution of subgroups 112, 114 within region 110; a spatial distribution of subgroups 112, 114 within effective group boundary 145; a subgroup displacement of one or more of subgroups 112, 114, relative to group 102, other subgroups 112, 114, or both; an effective subgroup boundary 116, 117 of respectively subgroups 112, 114; or a combination thereof. Also, supervisor 350 can determine a relative displacement of one or more members 104 relative to a reference position within region 110, to a reference position within effective group boundary 145, to a position of a subgroup 112, 114, to a position of one or more other members 104, or a combination thereof.

In general, members 104 of social group 102 position themselves, relative to other members 104, in accordance with forgoing social behavior and relationship principles. It can be advantageous for social group supervisor 350 to perform for spatial distribution processing of sensed positional information corresponding to received tag beacons 333, and to apply a behavioral model corresponding to sensed spatial distributions of group 102, subgroups 112, 114, or individual members 104, within region 110, effective group boundary 145, or both. Supervisor 350 also may adaptively form one or more behavioral models from positional information sensed during successive observations or over a predefined observation interval. One suitable positional information may be an intermember displacement.

An intermember displacement may describe an identifiable displacement between adjacent members 104, as defined by a predetermined displacement rule, for example, in a social group management computer program, operating on supervisor 350. Although the predetermined displacement rule may be provided as a preselected displacement, it also may be a predetermined adaptive displacement rule, which may dynamically derive a value for an intermember displacement from a sensed social group spatial distribution, using a preselected displacement as a boundary or initial value.

It can be advantageous to determine more than one measure of an intermember displacement. In one example, it may be useful to identify unit intermember displacement 150, as may be derived from a mean spatial separation between respective member tags 300, such as between members 106 and 108. Subgroup intermember displacement 153 may be determined as a measure of mean spatial separation between subgroups 112, 114. Unit intermember displacement 150 also may be derived from an average spatial separation between members of social group 102. In another example, it may be useful to identify maximum intermember displacement (MID) 155, as a maximum acceptable spatial separation between adjacent members, such as between members 116 and 118. In selected implementations, MID 155 may be used to dynamically determine effective group boundary 145.

Beneficially, one or more intermember displacements, including MID 155, may be used by supervisor 350 to infer a predetermined group wellness state of social group 102, a predetermined subgroup wellness state of subgroup 112, 114, a predetermined member wellness state of member 104, or a combination thereof. Pursuant to inferring a wellness state of a group, subgroup, or member, supervisor 350 may be configured to determine a behavior of the respective group, subgroup, or member from one or more intermember displacements.

In accordance with embodiments of the present disclosure, social group supervisor 350 can be configured to sense a displacement of a member 104 relative to group 102, or subgroup 112, 114, and to infer a wellness state from the sensed displacement. A wellness state can be a well member state or a distressed member state. Moreover, system 100 can determine a corresponding behavior in response to the sensed displacement. A determined member behavior may be a compliance behavior or a variance behavior. Social group supervisor 350 can be configured to transmit an alert over network 390 to portable wireless device 375. Device 375 may display the alert thereby evoking an alert response, for example, by a group authority such as a social group steward, a social group manager, or a predetermined social group authority. Supervisor 350 may transmit a distress alert, if a predetermined distressed member state is inferred, or a situation alert, if a predetermined well member state is inferred. A situation alert also may be transmitted in response to a sensed behavior denoted to be of interest, although an adverse member state may not be inferred.

It may be desirable for social group supervisor 350 to infer a predetermined subgroup wellness state of a social subgroup, such as subgroup 112. Examples of a predetermined subgroup wellness state include a well subgroup state and a distressed subgroup state. It may be desirable to monitor breeding behavior of female members of social group 102, for example, to detect an inability to conceive, "catch." When a female cattle, such as female member 172, enters estrus, or heat, male members 174, 176, and 178, may cluster close to female 172, forming subgroup 112, and may engage in identifiable sexual behaviors. Typically, to engage in such behaviors, adjacent members are positioned with an intermember displacement generally less than unit intermember displacement 150. In addition, relative positions of subgroup 112 members may correspond to subgroup spatial distribution indicative of a breeding behavior.

Also, such behaviors include a temporal component, because they may occur at identifiable intervals and may evolve in an identifiable temporal sequence. Accordingly, supervisor 350 may be configured to process spatial distribution information received over an observation interval in tag beacons 333 from respective tags 300 of group and subgroups members, in this example, members 172, 174, 176, and 178. Supervisor 350 can evaluate received temporal-spatial data, and identify a breeding behavioral model as corresponding to sensed displacements of subgroup 112 members 172, 174, 176, and 178, during the observation interval.

Breeding behavior may not be indicative of a distressed member or subgroup state; although such behavior may be a predetermined well member or subgroup state for which social group supervisor 350 may transmit a situation alert to a group authority. However, over time, female member 172 may engage in repetitive breeding behaviors without conceiving, for example, each month for three or more months. A repetitive breeding behavior may be a result of a disease, an injury, or a physical anomaly. Social group management system can be configured to monitor behavior over time, for example, by storing sensed and behavior data, and by comparing a current sensed data or a current behavior, with stored data. Social group supervisor 350 may identify a repetitive breeding behavior, from which a distressed member state may be inferred, and in response, may transmit a distressed state alert, corresponding to member 172 or to subgroup 112, without limitation, to a social group steward, to a social group manager, or to a predetermined social group authority.

Also in subgroup 112, members 182 and 184 may be male members positioning themselves in an aggressive posture, relative to each other. For example, member 182 may position his torso generally perpendicular to the torso of member 184. During the course of sensing locations of respective members of social group 102, sensed tag beacons 333 corresponding to members 182 and 184, may indicate development of aggressive behavior. Aggressive behavior may be related to aforementioned breeding behavior, or may correspond to other factors including restructuring of a dominance relationship, interloping, disease, or fouled forage. If an aggressive behavioral model is selected in response to the sensed locations of members 182, 184, it may be desirable for social group supervisor 350 to closely monitor behavior which may be evolving between members 182 and 184. In selected embodiments, social group supervisor 350 may be configured to monitor locations of members 182 and 184 more frequently than locations of other members of social group 102. If sensed locations of respective tags 300 correspond to an aggression behavior model for members 182 and 184, it may be advantageous to infer a distressed member or subgroup state from the observed aggression behavior. One or both of members 182, 184 may be designated as distressed members, for which a distress alert may be transmitted, without limitation, to a social group steward, to a social group manager, or to a predetermined social group authority.

Tag 300 can be a passive tag, an active tag, or a combination thereof. A passive tag does not include an internal power source. In some implementations, a passive tag may rely on energy transferred from a tag reader to actuate tag circuitry and to produce a passive tag response. For example, a passive radiofrequency (RF) tag may be energized by incident RF energy, which provides sufficient power to operate internal tag circuitry and to produce a passive tag response. However, certain passive tag implementations may not require RF energy, or have internal tag circuitry. An optical passive tag may be a stripe, spot, or distinctive indicia, which may bear a predetermined color coding, which can produce an optical passive tag response, when incident light energy is reflected from the optical passive tag.

In a passive tag system, tag 300 may be energized by energy inherent in a probe query transmitted by transceivers 120, 122, 124. In response to a probe query, passive tag 300 emits tag beacon 333 as a passive probe response. Tag beacon 333 may can be received by transceivers 120, 122, 124 by tag 300 to a probe query by transceivers 120, 122, 124. Transceivers 120, 122, 124 may employ, without limitation, a triangulation technique well-known in the art of livestock management, to facilitate position determination of tag beacon 333, and corresponding member 104, by supervisor 350. In this way, the unique identity and location of each member 104 of social group 102 may be ascertained, and corresponding spatial distributions may be determined. A well-known retrodirective interrogation-response locating technique also may be used. Tag beacon 333 can transmit a unique identification 317 corresponding to the respective social group member 104 to which passive tag 300 is coupled. However, it may be desirable to employ an active tag system to monitor a member, subgroup, or group wellness state, using a wider range of contemporaneous information, such as biometric data.

An active tag is self-powered and typically employs an internal power source to operate internal tag circuitry and to produce an active tag response. Internal tag circuitry may include, without limitation, sensing, processing, or communication circuitry. Non-limiting examples of an active tag power source include a battery, a photovoltaic cell, a thermoelectric power source, or a piezoelectric power source. An active tag may be capable of sensing, monitoring, or processing autonomously or semi-autonomously, and of communicating with local or remote supervisory systems.

In an active tag system, tag 300 may emit tag beacon 333 as an active probe response, and may be configured to do so with or without a query by social group supervisor 350. For example, an active tag 300 may emit tag beacon 333 substantially continuously, or may only transmit tag beacon 333 in response to an active probe from transceivers 120, 122, 124. In another example, in response to a predetermined condition of member 104, active tag 300 may be configured to operate in a reduced-power mode or to emit tag beacon 333. Similar to a passive tag in a passive tag system, an active tag 300 can impart to tag beacon 333, unique member identification corresponding to member 104 to which tag 300 is coupled. Member identification may be globally or locally unique, as described above. Beneficially, active tag 300 may be configured to sense biological functions of member 104 and to transmit sensed biometric data in tag beacon 333. Transmitted respective member biometric data may be received by one or more of transceivers 120, 122, 124, and be relayed to social group supervisor 350.

Similar to operation of a passive tag system, a location of active tag beacon 333 may be determined by transceivers 120, 122, 124 using well-known radio beacon triangulation or interrogation-response locating technique. However, an active tag 300 may be configured to use tag beacon 333 to communicate with a wireless network system, of which social group supervisor 350 may be a constituent element. Such communication may include bidirectional communication between tag 300 and supervisor 350, thereby facilitating therebetween activation, data transfer, updating, and interrogation-response communications. In selected embodiments, for example, active tag 300 may be configured to operate in accordance with a low-power IEEE 802.15.4 WPAN communication protocol, which may facilitate long battery life in tag 300, while providing communications and high-precision ranging. Transceivers 120, 122, 124 can communicate with tag 300 using a WPAN communication protocol, and also may be configured to communicate using other wireless protocols, with supervisor 350, with a portable wireless device, or both.

A suitable wireless network system may operate in accordance with one or more of wireless personal area network (WPAN) protocol, a wireless local area network (WLAN) protocol, a wireless metropolitan area network (WMAN) protocol, or a wide-area network (WAN) protocol. A non-limiting example of a WPAN IEEE Std. 802.15.4 communication protocol can be a ZigBee™ communication protocol, promulgated by the ZigBee™ Alliance, San Ramon, CA, USA. Non-limiting examples of WLAN protocols, in the United States, include those families of wireless communication protocols corresponding to IEEE Std. 802.11 (e.g., WiFi® WLAN protocol), and IEEE Std. 802.15 (e.g., Bluetooth® WPAN protocol). Non-limiting examples of a WMAN protocol, in the United States, includes those families of wireless communication protocols corresponding to IEEE Std. 802.16 (WiMAX® WMAN protocol) and IEEE 802.20 (Mobile Broadband Wireless Access protocol). Non-limiting examples of a WAN protocol include those families of wireless communication protocols corresponding to wireless mobile WAN standards commonly called 2.5 G (e.g., HSCSD, EDGE, or GPRS protocols), and 3 G (e.g., IMT-2000 protocol families). The foregoing wireless protocols are merely exemplary, so that the present disclosure contemplates use of other suitable wireless protocols in use or in development in other global regions (e.g., WiBRO™ in Korea).

Tag 300 may represent a multi-element tag system, which may be an integrated multi-element tag system, or a discrete multi-element tag system. In an integrated multi-element tag system, tag 300 includes therein functional elements of both an active tag and a passive tag. Such elements may operate in concert or independently. In a discrete multi-element tag system, tag 300 may be a multi-element tag system employing a discrete active tag and a discrete passive tag, which may operate in concert or independently. In an example of a multi-element tag system, member 104 may bear an active tag, such as a powered ear tag capable of autonomously transmission, and a passive tag, such as a colored stripe, capable of being optically detected, for example, by satellite or aerial observation.

Conveniently, one or more of transceivers 120, 122, 124, and interrogation supervisor 350 may be discrete elements of a large scale radio tracking system, or be integrated into a portable or handheld wireless device. A large scale radio tracking system, for example, using a WAN network, may allow remote communication with active tags 300 over a large region. A portable wireless device, for example, using a WLAN network, which may facilitate on-site monitoring of social group members 104 and social group 102, for example, by a social group steward or handler. As is known in the wireless communication arts, a portable wireless device can be configured in a "dual-band" mode, by which a communication mode of a portable wireless device may selected between a WPAN/WLAN/WMAN mode and a WAN mode, and thus may be capable, for example, of ZigBee™ WPAN communications, WiFi® WLAN communications, and GSM mobile communications.

Beneficially, tag 300 may incorporate a global navigation satellite system transponder, and be configured to determine a corresponding globally-unique geospatial position (GUGP). Tag 300 may incorporate GUGP data into tag beacon 333, so that supervisor 350 may determine the geospatial position of member 104, to which tag 300 is affixed. Non-limiting examples of a global navigation satellite system, suitable for use by tag 300 can include the NAVSTAR Global Positioning System (GPS); the GLONASS satellite system, the Galileo Navigation System, or the Beidou Navigation System. It is contemplated that tag 300 may be modified to accommodate other global navigation satellite systems which may be implemented. It may be beneficial for tag 300 to generate and transmit GUGP data, for example, when member 104, or group 102 may be dispersed over a large geographic area.

It may be advantageous for active tag 300 to sense biometric data corresponding to one or more members 104 of social group 102. Active tag 300 may include one or more biostate sensors 330, 332, 334, 336, which can detect one or more respective biological states of member 104 to which tag 300 may be attached. In general, a biostate sensor, such as sensors 330, 332, 334, and 336 may produce respective sensed biometric data representative of the one or more respective biological states. It may be desirable to couple tag 300 to a portion of member 104 in a location that may be both convenient for attachment and proximate to at least one biometric source. In FIG. 3, tag 300 is attached to ear 333 of member 104, and generally proximate to an arterial blood vessel 310. Other locations and biometric data sources may be used, of course. Sensed biometric data corresponding to member 104 may be transmitted by active tag 300 to supervisor 350, for example using a suitable wireless network system. Supervisor 350 may use the sensed biometric data to refine a selection of a behavior model represented by location information corresponding to a member, a subgroup, a social group, or a combination thereof. In selected embodiments, sensed biometric data from biostate sensors 330, 340 may be used to identify a distressed member, a variance behavior, or both, without inference, if supervisor 350 is so configured. Such capabilities may permit rapid notification of an emerging problem or disease corresponding to an adverse member state, and may facilitate timely intervention to correct or ameliorate the undesired member state.

Non-limiting examples of a biological state of member 104 may be a kinematic state or a thermal state. A kinematic state may correspond to a posture, a motion, a sound, or a combination thereof, and may be detected by one or more of an accelerometer sensor 330, a wave motion sensor 334, or an acoustic sensor 336. Sensed data produced by one or more of sensors 330, 334, 336 can be transformed into an electrical signal suitable for transformation and transmission by tag 300 to transceivers 120, 122, 124 by way of tag beacon 333.

Non-limiting examples of identifiable postures in cattle may be a head lowered or turned back against the body, or a rigid posture, and may include changes in posture. A lowered head may be exhibited by distressed member 190, in response to predator 175. Another posture may be a sleeping posture in which the member's head may be turned back towards its body. Rigid posture may indicate pain or a death state. Non-limiting examples of a motion in cattle may be a tongue movement, a facial expression, grinding of teeth, or inappropriate contact with other members. Distressed member 190 may extend its tongue or make a facial gesture in response to predator 175. Grinding of teeth by distressed member 190 may indicate pain due to an injury or a disease. Distressed member 190 may engage in inappropriate contact with another member, for example, expressing aggression or variant sexual conduct (e.g., buller steer syndrome). Motions on a different scale of size may be sensed and identified as well. For example, another non-limiting example of a motion may be motion of blood vessel 310 proximate to a coupling site of tag 300, indicative of an elevated heart rate, an elevated blood pressure, or both.

A non-limiting example of a sound can be a vocalization. Social animals, such as cattle, can produce discrete vocalizations corresponding to behavioral or affective states. In general, a vocalized sound can be considered as an episodic mechanical (vibrational) signal, having a waveform characteristic of the entity generating the sound. Non-limiting examples of waveform characteristics may include, duration, resonance characteristics, amplitude envelope, inharmonicity, onset asynchrony pitch, and frequency modulation. Resonance characteristics include the frequencies and bandwidths of vocal formants; amplitude envelope characteristics include attack, decay, and tremolo characteristics; and frequency modulation characteristics include vibrato and jitter. Social animal vocalizations may be characterized and modeled, and such models may be stored, for example, in memory of supervisor 350, such that when a mechanical signal representative of a predetermined vocalization is received, the represented vocalization can be identified and a behavioral state corresponding to the source member may be ascertained. In the case of distressed member 190, a vocalization characteristic of fear, calf locating, companion seeking, or a perception of predation may be emitted in response to predator 175. The vocalization can be sensed by a displacement state sensor, such as accelerometer sensor 330, a wave motion sensor 334, or an acoustic sensor 336, transformed into a corresponding electromagnetic signal, and transmitted by active tag 300. Other sensed vocalizations also may be detected and transmitted to supervisor 350.

Another non-limiting example of a sensed biometric sound can include an ingestive sound, such as biting, chewing, ruminating, or swallowing a bolus of food. Ingestive sounds can be quasi-periodic and can possess identifiable waveform characteristics corresponding to a feed rate, feeding efficiency, or digestive conditions, among others. Such biometric sound data may be useful in determining feed rate, a health state, or a behavioral state of member 104. Other non-limiting examples of biometric sounds can include grunting, sounds related to grooming activities, aggressive contact between the subject source and another member of the group, and blood flow through an arterial blood vessel.

Alone or in combination, sensed kinematic biometric data may provide empirical evidence of an inferred member state, and may be a direct indication of a member distress state.

Of course, a skilled artisan will realize that a kinematic state sensor can be configured to perform one or more of the functions effected by sensors 330, 332, or 334. For example, accelerometer sensor 330 may be configured with multiple accelerometers joined in alignment to predetermined orientations, for example, three accelerometers joined in an orthogonal alignment. Such an accelerometer sensor 330 may be capable of detecting a posture or a motion corresponding to member 104. In addition, accelerometer sensor 330 may be configured to respond to kinematic states of varying scales of size, including large scale motions (body movement), mid-scale motions (head, tongue, or ear movement), micro-scale motions (heart rate, bone-conducted sound, particular muscular movements), or a combination thereof. Accelerometer sensor may be configured to produce a data stream representative of the sensed kinematic activity of member 104 for one or more scales of size.

A thermal state may be sensed by a miniature thermocouple or other thermal sensing device, sensitive to biological temperature variations proximate to a coupling site of tag 300. For example, in cattle, suitable thermal data may be sensed from auricular blood vessels, such as blood vessel 310. Sensed thermal data may be transformed into an electrical signal suitable for transmission by tag beacon 333 to be received by supervisor 350. A sensed thermal state may be indicative of health, disease, dehydration, estrus, or other biological states affecting a body temperature of member 104, and may empirically support an inference of, or directly indicate, a distressed member state.

Other biological states of member 104, and combinations thereof, may be monitored using biosensors incorporated into active tag 300. Tag 300 may transmit a multi-band or multi-dimensional signal stream in tag beacon 333, which may be divided into constituent frequency band streams, be filtered to extract relevant signals, including kinematic, thermal, or other biometric signals, and be processed to characterize the biometric data embedded therein. Sensed biometric data may be selectively sensed to identify preselected problems corresponding to a distressed member state. In response, supervisor 350 may be configured to determine a behavior from the respective processed data streams, alone or in combination with a spatial configuration or a spatial displacement; to infer a wellness state of a member, a subgroup, or a group from the determined behavior; and to provide a perceptible indication the inferred wellness state.

Sensed biometric data also may be sampled and stored periodically for longitudinal monitoring of member 104, subgroup 112, 114, or group 102. Periodic sampling may occur during at least a part of a diurnal cycle, a breeding cycle, a calendar period, or a solar season, to characterize behaviors of members, subgroups, and social groups. Biometric data may be sensed, sampled and stored aperiodically, as well. Such data tracking may be performed, for example, to develop normative data values, to track and adapt to seasonal, aging, or breed trends, or to conduct prospective or retrospective analysis of member 104, subgroup 112, 114, or group 102.

Such sensed data may be used in conjunction with other data pertaining to a monitored member 104, for example, gender, date of birth, lineage, weight, point of origin, geographic locations of previous groups, breeding status, market value, feed preferences, or data of interest, for longitudinal characterization of social group behavior state variations, subgroup typing or preferences, or stereotyped breed social behavior identification. It may be desirable to store selected data for member 104 in trace record 377. On a social group level, aggregated biometric data sensed from members of social group 102 may support an inference of group stress, for example, due to predation, to exhausted resources such as food, water, or mineral supplement, or to spread of disease among social group members. Trace record 377 may be used to trace characteristics of one or both of group 102 or subgroup 112, 114. For example, trace record 377 may be configured to collect and maintain selected data regarding an individual member 104 from conception to production or destruction, thereby providing an evidentiary chain which may assist in identifying disease sources, member wellness, or misappropriation corresponding to the respective member lifespan.

In general, a tag beacon is emitted within an observation space by each tag coupled to a representative member of a defined social group. In accordance with the foregoing, an active tag 300 may emit tag beacon 333 continuously, at predefined intervals, in response to a sensed member state, or as a result of an active tag probe by supervisor 350 via transceiver 120, 122, 124. Tag 300 may push data to supervisor 350, or may wait to be polled by supervisor 350 before transmitting data. Also, a tag beacon displacement can correspond to an intermember displacement of a member relative to another member, to a subgroup, or to the defined social group 102. Therefore, a position of member 104 in monitored region 110 may be indicated by a corresponding spatial location of tag beacon 333, or a tag beacon displacement.

Tag beacon 333 may be represented in a sensed observation space (relative), in a predefined geospatial region (absolute), or both. An effective group boundary may be a non-limiting example of a relative observation space, and a physically-defined implementation of region 110 may be a non-limiting example of an absolute observation space. A sensed observation space may be mapped to a predefined geospatial region, and vice versa, by a technique known as registration. Other geospatial information may be mapped to an observation space, including attractor and repulsor location information.

A tag beacon cluster generally represents two or more proximately disposed members 104. For example, a tag beacon cluster may represent a respective identified subgroup, such as subgroups 112, 114, an emergent group of two or more members 104, or the defined social group 102. A tag beacon cluster may be represented in a sensed observation space (relative), a predefined geospatial region (absolute), or both. A sensed observation space may be mapped by registration to a predefined geospatial region. A tag beacon cluster configuration may represent an aggregate characteristic spatial distribution of identifiable members 104 in, or relative to, a defined social group 102 or a social subgroup 112, 114. A group behavior may correspond to, and be inferred from, a tag beacon cluster configuration in a sensed observation space. A group behavior may be considered a characteristic of an individual member 104 of group 102.

It may be advantageous to provide rustle alert sensor 115 in a location of region 110 where unauthorized egress of one or more members 104 of social group 102 is likely to occur, for example, at a road or a trailhead. Sensor 115 can be configured to sense a tag beacon 333, to detect passage of one or more members 104 of social group 102, to read unique member identification from tag 300 from tag beacon 333, and to cause a rustle alert including the unique member identification to be transmitted by social group supervisor 350, for example, to a social group authority, including a law enforcement, regulatory, or administrative body. Sensor 115 may employ a wireless communication protocol, and may use one of more of transceivers 120, 122, 124 to relay the alert to supervisor 350. Rustle alert sensor 115 may be disposed at other locations, for example, public highways and truck stops, so that purloined members may be tracked until recovered.

Figure 2:
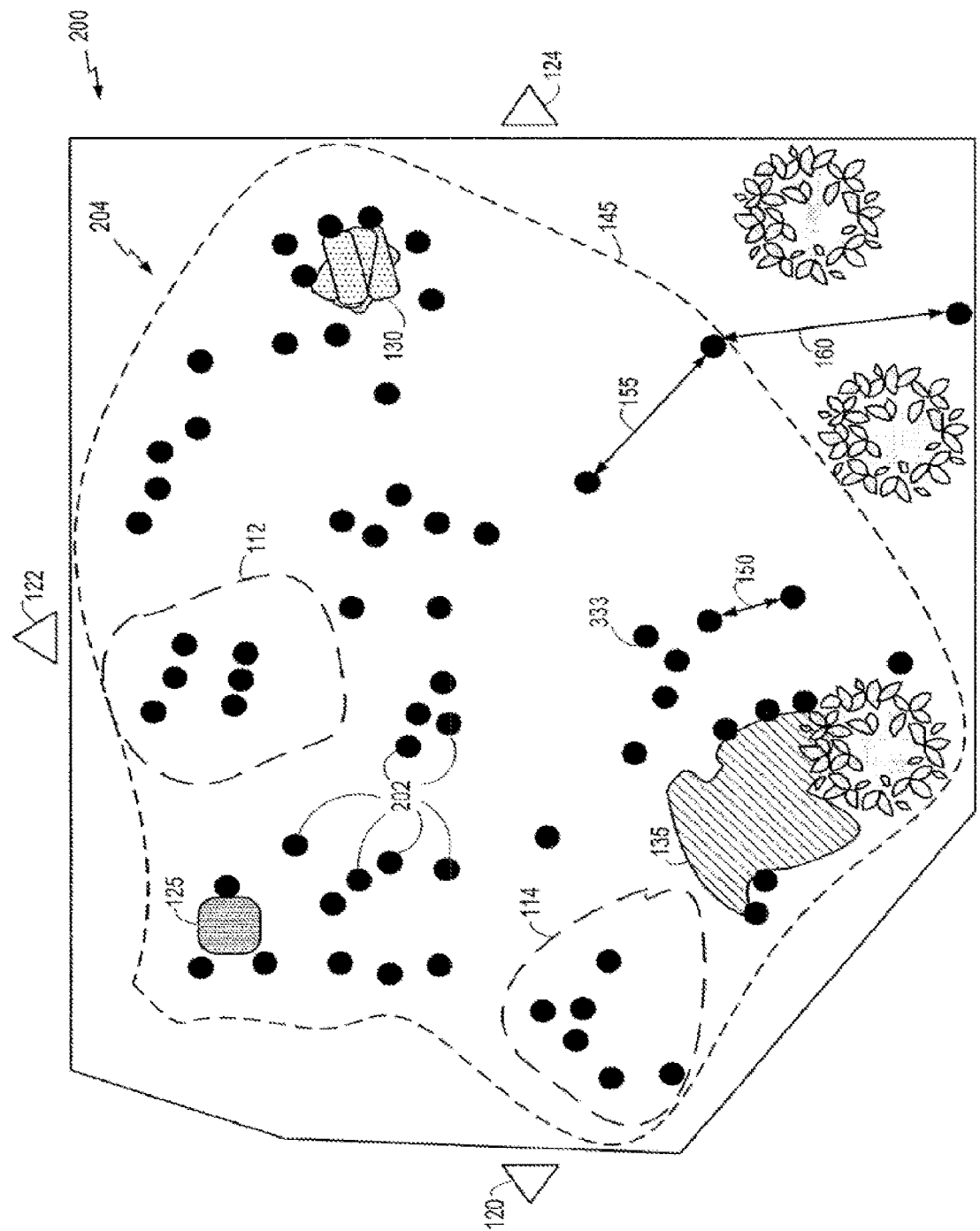
FIG. 2 is a graphical illustration of an exemplary spatial distribution of a monitored social group, corresponding to the system illustrated in FIG. 1.

FIG. 2 is a logical depiction of a virtual image 200 corresponding to entities in FIG. 1 with like reference numbers. FIG. 2 may represent a virtual social group, in which received tag beacons 333 represent respective known virtual members, and which may be analyzed in real time, or near-real-time, to observe member behaviors and to infer a wellness state of respective members thereby. Initially, transceivers 120, 122, 124 may scan or sense tag beacons 333 from tags 300 coupled to respective members 104 of social group 102, thereby forming (S405) a sensed image. An "image" is used in the sense of a physical or virtual representation of a property or an entity in two or more dimensions. An image may describe a spatial distribution of a physical property, like reflectivity, which can be transformed or mapped to a different property. Typically, sensed image 200 in FIG. 2 is representative of spatially-distributed, and potentially overlapping, tag beacons 333 transmitted by tags 300 of members 104, and detected by transceivers 120, 122, 124. Each tag beacon 333 may be represented within group cluster 200. The aggregation of tag beacons 333 of group 102 may be represented as group duster 202.

Group cluster configuration, generally at 204, can provide spatial distribution and configuration about group 102, with respect to a physical observation region, such as region 110 (as symbolically represented by region icon 250), with respect to a virtual observation region, such as effective group boundary 145 (as symbolically represented by boundary icon 252), or with respect to both. Other geospatial information may be represented in image 200. In addition, image 200 may contain member grouping data, including representation of subgroup 112, 114. Group cluster configuration 204 may have both an identifiable spatial characteristic at a selected observation, and an identifiable spatiotemporal characteristic over a selected observation period. One or both of the identifiable spatial characteristic or the identifiable spatiotemporal characteristic can indicate group behavior. During an observation period, initial and final positions of each group member 104 may be identified by detecting and characterizing corresponding tag beacons 333 and tag beacon clusters, including group cluster 202. In addition, a respective displacement vector may be determined indicating the distance and direction traveled by group member 104 during the observation period. In the aggregate, sensed tag beacons 333 from each member 104, subgroup 112, 114, and group 102 may form identifiable spatial distributions, indicative of a group behavior from which wellness state inferences may be drawn.

As depicted in FIG. 3, supervisor 350 may include an I/O channel 320 by which to receive from transceivers 120, 122, 124, as serial digital data representative of sensed tag beacons 333 and to send the data to CPU 322 to facilitate processing. Supervisor 350 also may have secondary and storage memory 324, which may be used in conjunction with CPU 322 for data processing. Coupled to CPU 322 and memory 324 may be spatial data classifier 371, behavior classifier 373, inference engine 375, and a database function, such as trace record database 377, in which may be stored behavior information, behavior models, demographic information, biometric information, or other pertinent information. Social group supervisor 350 manage trace record database 377 so that information pertaining to member 104, subgroup 112, 114, or group 102 may be collected, arranged, updated, and stored. Such information may include predetermined attributes, empirical observations and determinations, and dynamic data, including sensed biometric data.

Social group supervisor 350 may be configured to selectively collect, record and maintain in trace database 377 information corresponding to, without limitation, selected spatial configurations; expected locations, grouping, movement, or behaviors; subgroup configurations and preferences; seasonal variations; geospatial information; expected consumption rates of food, water, and mineral supplements; species, lineage, breed attributes; chain of ownership, residence, or transportation; medical, inoculation, health maintenance, and treatment norms, histories, and expectations; biological attributes; past, current, or expected breeding behavior; empirical, inferential, or predictive metrics, rules, and expectations; boundary conditions; or other selected information identified as being beneficial to social group management. Also, social group supervisor 350 may use trace record database 377 to formulate physiological, behavioral, sociological, and environmental norms, models, and rules, which may be used to determine a behavior or infer a wellness state of one or more of member 104, subgroup 112, 114, or group 102. Trace record database 377 also may be used by one or more of spatial data classifier 371, behavior classifier 373, or inference engine 375. In addition, social group supervisor 350 may manage trace record database 377 adaptively.

Classifiers 371 and 373 may function alone, or may cooperatively interact to identify behaviors of member 104, subgroup 112, 114, or group 102 from sensed tag beacon data, alone or in combination with information maintained in trace record database 377. Moreover, inference engine 375 may be used to infer a member wellness state, a subgroup wellness state, a group wellness state, or a combination thereof. Alerter 326 may generate and transmit alert 360 over network 390 for receipt by a group authority, such as a group steward. Group authority may operate a portable wireless device 395, by which to receive alerts and group-related information. In an instance in which a distressed member state can be inferred, alert 360 may be a distress alert corresponding to the identified distressed member, such as member 190. Alerter 326 also may generate and transmit alert 360 as a status alert, for preselected member wellness states other than distressed. By generating and transmitting alert 360 according to predetermined alert rules, supervisor 350 may provide rapid notice of a distress state to a social group steward, and may enable prompt and timely intervention. One or more of classifiers 371, 373, or inference engine 375 may be implemented in hardware, in software, or in an effective combination thereof.

In certain embodiments, group spatial distribution may be characterized using simple bit map analysis techniques, well-known in the art of image analysis. For example, region 110 may be modeled as a bitmap field, with a rectangular grid having generally evenly-spaced horizontal and vertical lines intersecting at predetermined Cartesian positions. Each point of intersection, or region proximate to such intersection, may be assigned a predetermined value. An image bit, representing tag beacon 333 for a corresponding group member 104 may be assigned such a value, if present at a corresponding intersection in the bit map field. In the aggregate, a bitmap representative of group cluster 202 in FIG. 2 can be assigned a unique image identification number based on the presence or absence of an image bit (tag beacon 333) at the predetermined Cartesian positions.

Similarly, tag beacons 133 representing members 104 of group 102 may be sensed and aligned in proximity to a respective predetermined Cartesian position in a bitmap field corresponding to region 110. Geographical locations, including attractors and repulsors, may be overlaid on the bit map representative of group cluster 202. Bit map locations may be weighted, for example, to indicate a presence of an attractor or a repulsor, with the proximity of member 104 or subgroup 112, 114 bring represented in a weighted bit position value. Each spatial distribution of tag beacons 333 within region 110 may be assigned a unique group behavior ID. Member clustering such as with subgroup 112 and 114 also may be represented generally within the group behavior ID, and may influence the behavior ID value. Selected group behavior IDs may be used to infer a group distress state for group 102. Thus, it may be possible to identify a group behavior at selected observation, and to identify a change in group, subgroup, or member behavior over an observation period, using a simple bitmap image analysis technique. However, it must be understood that FIG. 2 is a logical representation having graphical characteristics of a visual image, which does not imply that graphical determinations, similar to the aforementioned bitmap analysis technique, need to be used to determine behavior or to infer a wellness state of one or more of member 104, subgroup 112, 114, or group 102. A bitmap technique may be insufficient where a rich data set corresponds to each member 104 of group 102.

Figure 4:
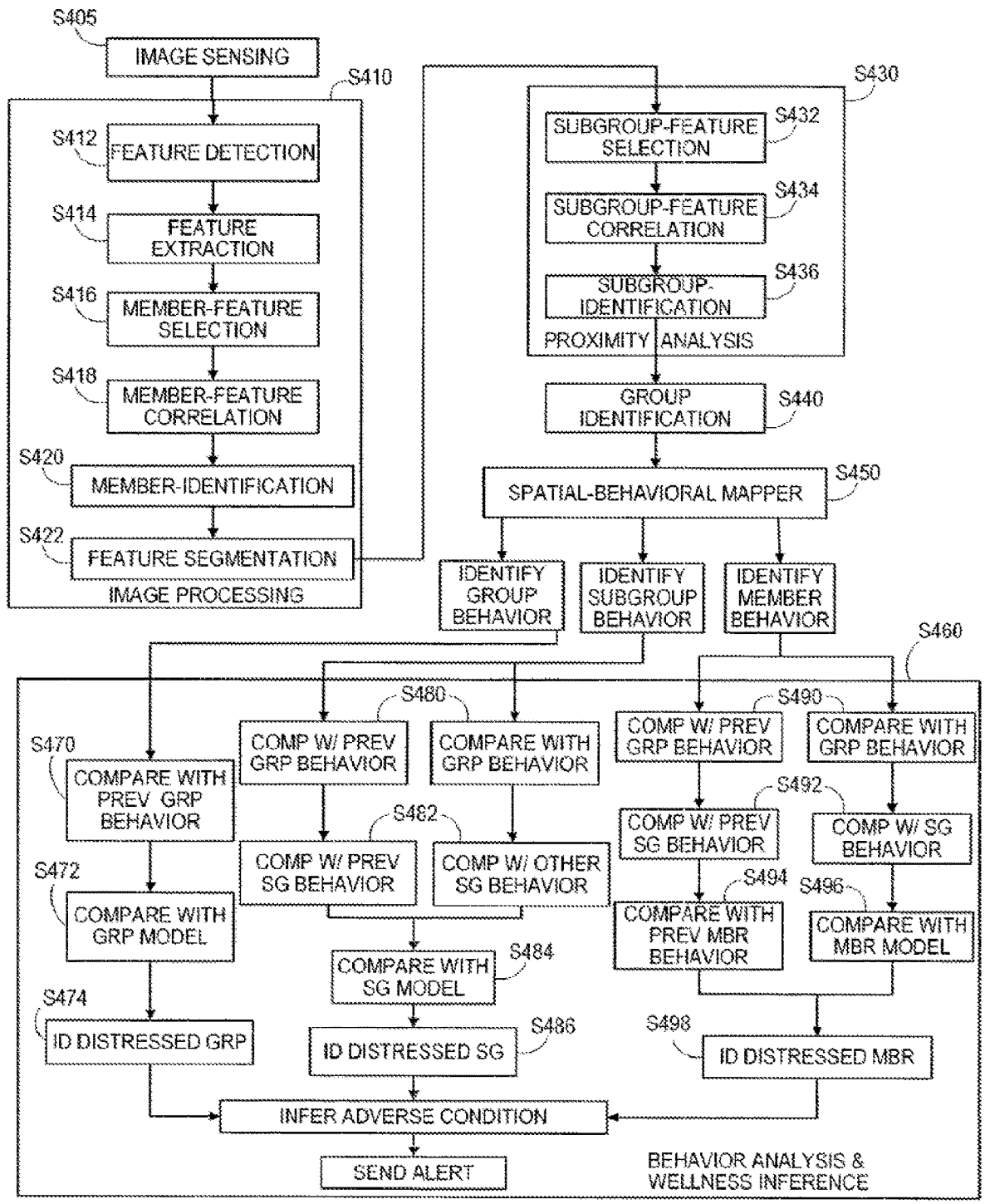
FIG. 4 is a general flow diagram illustrating embodiments of a social group identification, characterization, and inference process, in accordance with the present invention.

FIG. 4 illustrates example image processing methods by which member 104, and group 102 may be identified from a sensed spatial data stream corresponding to group tag cluster 202, which may contain spatiotemporal data, biometric data, or both. It may be desirable to analyze spatial data corresponding to group tag cluster 202, so that individual members 104 and subgroups 112, 114, may be discerned. Once identified, data vectors corresponding to each uniquely identified and spatially located member 104 of group 102 may be generated for behavior analysis and wellness state inference. FIG. 4 is described within the context of FIGS. 1-3.

It may be desirable to perform, for example, morphological image processing (S410) on the aggregation of received tag beacons 333. Processing S410 may include detecting (S412) features in the image field, which may correspond to a member 104 and extracting (S414) detected features as potential ones of members 104. It may be desirable to refine data corresponding to extracted features, facilitating selecting (S416) image features most likely to represent members 104. Tag beacons 333 from related members 104 may contain information facilitating the process of correlating (S418) member 104 with a likely feature. Tag beacons 333 typically include unique member identification, which may correspond to a data set for each member 104, and which may be assigned to a selected image feature in identifying (S420) member 104 of group 102. Process actions (S412, S414, S416, and S418) may be repeated iteratively as data from tag beacons 333 are received from region 110, although one or more of these actions may be omitted from processing S410. Desirably, morphological image processing S410 can produce a roster of identified individual members 104 of group 102, which may be used to determine whether one or more members 104 is absent from region 110 occupied by group 102. In order to facilitate identification of subgroups, such as subgroups 112, 114, it may be desirable to perform feature segmentation (S422) on the features corresponding to individual and clusters of tag beacon 333 signals. Morphological image processing techniques are well-known in the signal processing art.

Once individual members 104 and group 102 are identified, members 104 who are proximate, or neighboring members, may be determined, according to predetermined proximity analysis technique (S430). Technique S430 may be performed iteratively and recursively to identify subgroups 112, 114 within group 102. Because proximity among group members may change dynamically, it is desirable that predetermined proximity technique (S430) be adaptive over successive observation periods. Accordingly, it can be advantageous to employ a mean lineal intercept method as technique S430, which may provide a simple technique to recognize a subgroup 112, 114, yet adapt to a fluid society of members 104, which evolve over time. In an alternative proximity analysis technique (S430), an observation region may be modeled as an aggregation of neighboring cells or grains, in which group 102 is spatially distributed. Technique 430 may identify members 104 within a respective cell or grain, and may determine a member displacement from a location of a member 104 within a respective cell or grain, relative to one or more other members 104, subgroup 112, 114, or group 102. The member displacement of member 104 may be a variance behavior, if member 104 is located outside of a predetermined cell or grain, or if the magnitude of the displacement indicates that member 104 has strayed too far from a corresponding subgroup 112, 114, or from group 104. Such an alternative proximity analysis technique is well-known in those arts in which mapping techniques are employed.

Conveniently, proximity analysis may facilitate selection of features corresponding to a subgroup (S432). As subgroups are identified, their respective characteristics may be correlated (S434) with characteristics of known subgroups, or may be associated with an emergent subgroup. Correlation (S434) can facilitate known subgroup identification (S436), which also may include identification and characterization of an emergent subgroup. Collectively, by identifying individual members and subgroups, a "group" can be identified (S440).

It is desirable to characterize a member behavior on the basis of observed spatial characteristics of one or more members 104, of subgroup 112, 114, and of group 102. Accordingly, information regarding members 104 of herd 102 may be characterized by a spatial-behavioral mapper (S450). Such information may include, without limitation, spatial data, spatio-temporal data, biometric data, and demographic data. In selected embodiments, it can be advantageous to characterize behavior of members 104 of group 102 by observing interactions among individual members 104, which may lead to dynamic spatio-temporal aggregate behavior of group 102. Therefore, spatial-behavioral mapping (S450) may employ one or more modeling techniques generally related to a discrete element method (DEM). In general, DEM techniques are a family of related techniques designed to solve problems in which elements may exhibit gross motion and in which two elements may be considered as interacting while not touching. Any element within a defined interaction range of another element will be considered as interacting. Typical DEM techniques tend to be predictive, in that group properties, group behaviors and other group phenomena may be determined from the known state of the elements constituting the group. In a general, discrete element method analysis, each discrete element is allowed to move relative to other discrete elements during operation of the modeling process. The outcome of the modeling process may be influenced by characteristics of the corresponding data vector, by constraining forces, by adaptive characteristics, and by boundary conditions. Successive iterations of a discrete element modeling process may provide insight into expected discrete element transformation and movement.

While prediction suggests an output on the basis of a known input, empirical analysis may provide insight into an input on the basis of an observed output. In an empirical analysis, a spatial or spatiotemporal configuration of an observed group may be used to identify individual member behavior. Accordingly, it may be advantageous to perform an empirical DEM analysis technique by which to determine from spatial characteristics of group 102, a behavior of member 104 from group 102. In selected embodiments of an empirical DEM method, as may be used for spatial-behavioral mapping (S450) an observed group outcome is observed before analysis. The observed group outcome may have identifiable spatial characteristics, which may suggest behaviors of selected members 104. Also, some a priori information or expectations may be known about each member 104, at the start of the analysis, including interaction preferences, prior physical state, and a position of member 104 relative to group 102 prior to a current observation. In certain embodiments, trace record database 377 may serve as a reservoir for a priori information, for expectations, or both. Spatial-behavioral mapping (S450) also may use element environmental information to determine a behavior of member 104. In social animal groups, the environment in which the group members interact also may constrain member behavior, for example, with respect to geospatial and topographic conditions, forage, water, and other environmental factors. Interestingly, a behavior of member 104 also may indicate a change in environment or in other a priori information.

Typically, discrete element modeling can be a resource- and computation-intensive model due, in large part, to modeling following a predictive approach. However, with respect to characterizing defined social group 102, it may be advantageous to employ a discrete element method using inverse modeling techniques to effect an empirical analysis of group 102, subgroups 112, 114, members 104, or combinations thereof. While prediction suggests an output on the basis of a known input, empirical analysis may provide insight into an input on the basis of an observed output. In the context of defined social group 102, a discrete element method analysis modified to perform an inverse modeling technique, facilitates an inference of a member wellness state on the basis of an observed spatial configuration of one group member 104 relative to one or more other group members 104. Wellness states of subgroups 112, 114 also may be inferred thereby. Conveniently, those skilled in the art of discrete element modeling techniques can modify a disc rete element model to implement an inverse modeling technique for a discrete element method.

In an embodiment of spatial-behavior mapping (S450), it may be desirable to determine observe a spatial or spatiotemporal configuration of group 102, to identify a location of a member 104 during the observation, to determine whether there has been a change in position from a previous observation, to determine whether member 104 has had contact with, or was proximate to, one or more other members 104, and, if so, with which member contact was made, and to identify clearly anomalous changes in position over an observation interval. In addition, changes in a group spatial configuration can indicate an exhibited group behavior. Exhibited behaviors of group 102 may be identifiable as corresponding to specific behaviors of a specific member 104, which may simplify member behavior determination. In general, behavioral determinations tend to become more accurate as more information about the observed members is used in spatial-behavior mapping (S450). Thus, it may be desirable to characterize each member 104 as a discrete element, as is understood in the context of discrete element method analysis. In that regard, each member 104 may be represented uniquely by a member vector, M(i), which is formed from attributes of member 104. Each $i^{th}$ index of vector M(i) may correspond to a different attribute, for example of n attributes.

Selected attributes of member 104 are fixed or ascertainable independently of behavior observation in region 110, including, without limitation unique member identification, species, breed, gender, age, weight, origin, known dominance relationships, known subgroup affiliations, reproductive status, putative dominance status, and previous relevant sensed or normative biometric data. Selected other attributes forming member vector M(i) are dynamical data, which may include data obtained during observation of a behavior member 104. Representative dynamical data of member 104 may include spatial position within region 110, spatial position within effective group boundary 145, membership within an observed tag cluster, selected intermember displacements from member 104 subgroups, from related members of group 102, or from dominant members.

Other dynamical data which may be used in M(i) includes, without limitation, sensed biometric data. In an iterative form, a member vector may take the form M(i,j) in which (i) data elements represented in (j) observations. In the aggregate, group 102 can be represented by group matrix $G(j)=M_k(i,j)$, which may represent k group member vectors M(i) during (j) observations. It may be advantageous to form member vector M(i), at least in part, with data stored in trace record 377. Member 15 vector M(i) data may correspond uniquely to member 104, or correspond generally to group 102, or to subgroup 112, 114. As a result, spatial-behavior mapping (S450) using an empirical discrete element method may produce sufficiently accurate determinations (S455) of a behavior of member 104, subgroup 112, 114, or group 102, such that an appropriate inference about a wellness state of member 104, subgroup 112, 114, or group 102 may be made.

Beneficially, spatial-behavior mapping (S450) can produce behavior determination information, upon which a wellness inference analysis (S460) may be performed. In an embodiment of wellness inference analysis (S460), with respect to group 102, an observed behavior may be compared (S470) with a previous behavior of group 102; may be compared (S472) to selected predetermined behavior models, or both. The results of behavioral comparisons (S470, S472) may be analyzed (S474) to generate a wellness state inference for group 102. In addition, other selected group, subgroup, or member data, including selected biometric data, may be used during comparisons (S470, S472) and analysis (S474) to refine an inferred wellness state.

In an embodiment of wellness inference analysis (S460), with respect to subgroup 112, an observed behavior of subgroup 112 may be compared (S480) with a behavior of group 102, which may include a current or previous behavior; compared (S482) with a behavior of subgroup 112 or another subgroup 114, which may include a current or previous behavior; compared (S484) to selected predetermined behavior models for a subgroup 112, or a combination thereof. The results of behavioral comparisons (S480, S482, S484) may be analyzed (S486) to generate a wellness state inference for subgroup 102. In addition, other selected group, subgroup, or member data, including selected biometric data, may be used during comparisons (S480, S482, S484) and analysis (S486) to refine an inferred wellness state for subgroup 112. Subgroup behavior analysis and wellness inference may proceed for one or more selected subgroups 112, 114.

In an embodiment of wellness inference analysis (S460), with respect to member 104, an observed behavior may be compared (S490) with a current or a previous behavior of group 102; compared (S492) with a current or a previous behavior subgroup 112 or subgroup 112; compared (S494) with a previous behavior of member 104; compared (S496) with selected predetermined individual behavior models; or a combination thereof. The results of behavioral comparisons may be analyzed (S498) to generate a wellness state inference for member 104. In addition, other selected member data, including biometric data, may be used during comparisons (S490, S492, S494) to refine a wellness state inference analysis (S496). Within the context of FIG. 3, at least a portion of actions S410, S430, S440, S450, or S460 may be performed by one or more of spatial data classifier 371, behavior classifier 373, or inference engine 375, in cooperation with CPU 322 and memory 324. Trace record database 377 may be an example of a database that may manage a selected subset of member 104 information, or may manage a comprehensive longitudinal database for present and former members of group 102. One or more of spatial data classifier 371, behavior classifier 373, or inference engine 375, may be implemented in hardware, in software, or in an effective combination thereof.

Figure 5:
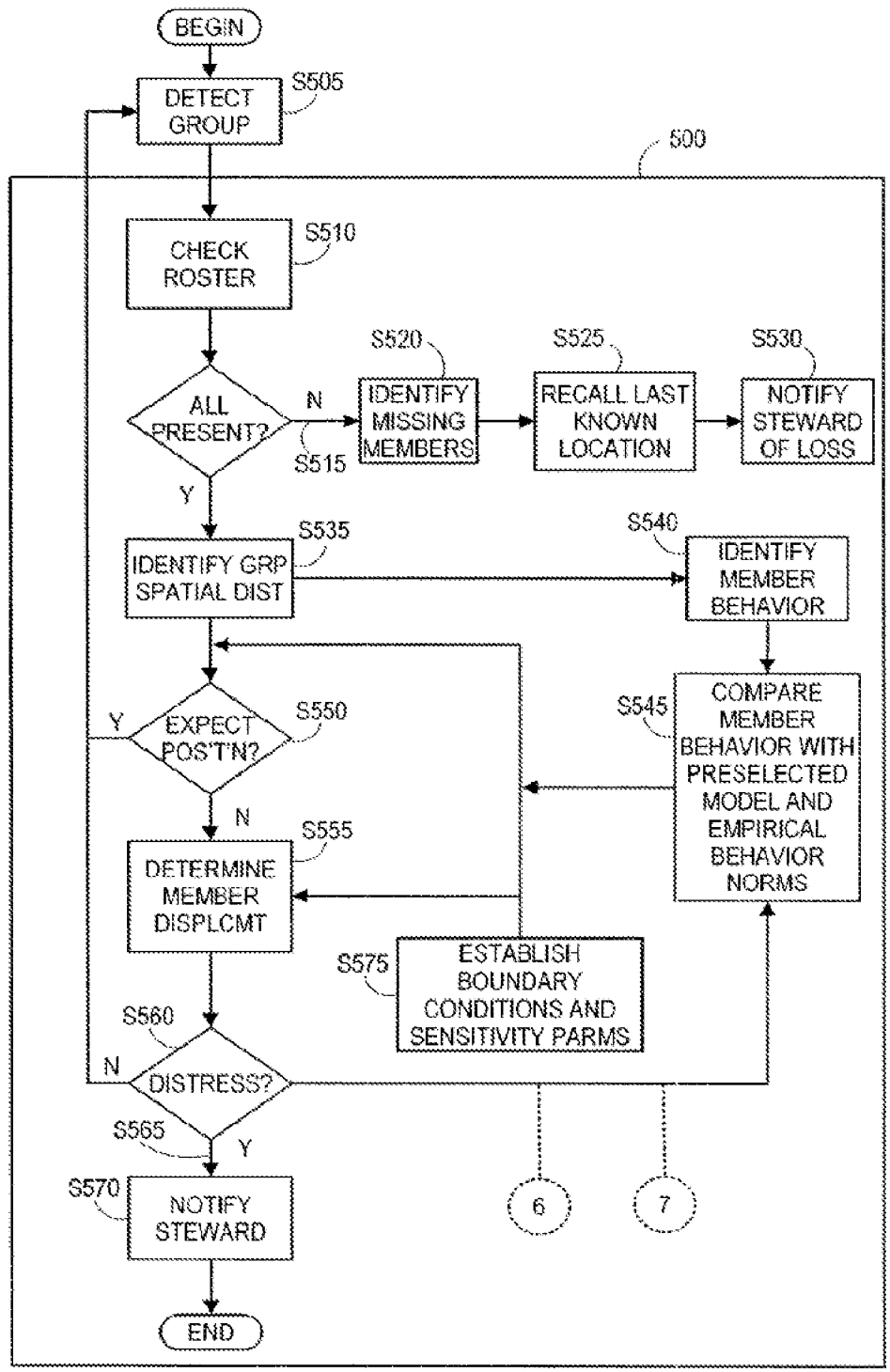
FIG. 5 illustrates one embodiment of a method by which a member wellness state can be inferred.
Figure 6:
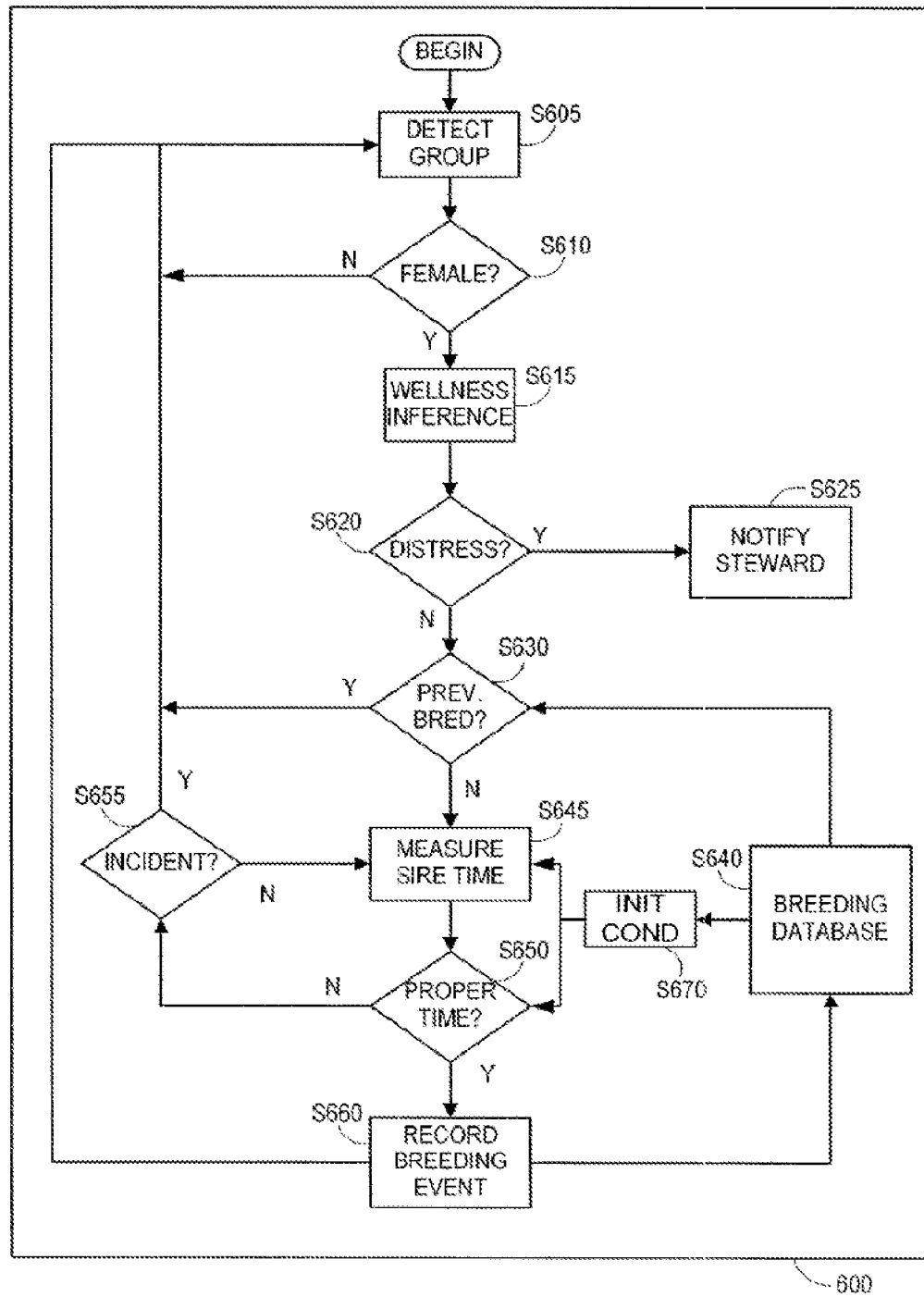
FIG. 6 illustrates one embodiment of an inferred member state (breeding) in accordance with the present disclosure.
Figure 7:
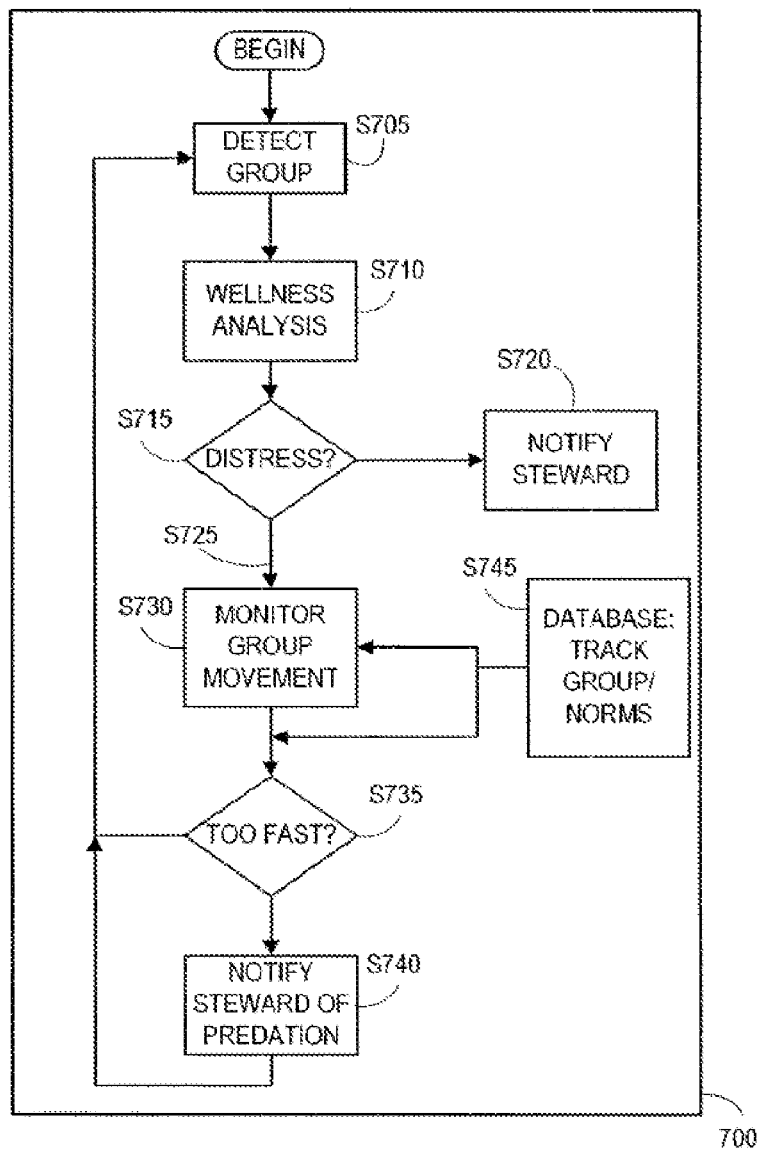
FIG. 7 illustrates one embodiment of an inferred member state (predation) in accordance with the present disclosure.

In accordance with the foregoing principles and embodiments, FIGS. 5, 6, and 7 respectively describe embodiments of a wellness inference analysis method, a breeding inference analysis method, and a predation inference analysis method.

FIG. 5 illustrates one embodiment of wellness inference method 500, by which a member wellness state may be inferred from the spatial positioning of member 104 relative to group 102. Method 500 may begin by detecting (S505) group members 104, and a spatial distribution of group members, in an observation region, such as region 110 in FIG. 1. Action S505 may be implemented in accordance with at least a portion of an embodiment of morphological image processing (S410) in FIG. 4, performed after a group spatial distribution of group 102 is sensed (S405). For example, action S505 may generally correspond to one or more of actions S412, S414, S416, or S418, depicted in FIG. 4. In an alternative embodiment, action 505 may correspond to a simple bitmap generation and searching technique. Also, after detecting group members (S505), it can be desirable to compare the identities of members 104 (S510) to a known roster corresponding to group 102. In a case where one or more members 104 may be missing (S515), it is desirable to identify (S520) missing members 104 and to recall (S525) the last known location of missing members 104. A distressed wellness state may be inferred for missing members 104, and a distress alert may be transmitted (S530) to a group steward for investigation. A spatial distribution of group 102 may be identified (S53S) from sensed group data, with a behavior of a member being identified (S540) thereafter.

With respect to FIG. 4, one or both of actions S535 and S540 may be effected, for example, by a spatial-behavioral mapping technique, such as action S450. Member behavior so identified may be recorded in a database (S545), for example, trace record database 377 in FIG. 3. In addition, member behavior may be compared to a preselected behavior norm, an empirically-determined behavior norm, or both. Action S545 may be accomplished, for example, by all or part of an embodiment of behavioral analysis and wellness inference method 5460), although other behavior analysis techniques also may be used. In embodiments in which an expectation model of member behavior is employed, it may be beneficial to determine whether one or more members 104 are positioned (S550) in an expected location. If it is determined that members are in an expected location, method 500 may resume detecting group members (S505). Otherwise, one or more of a member displacement or a member movement, may be determined (S555) relative to group 102.

Member displacement or member movement may be used to infer (S560) whether member 104 is in a distressed wellness state. Where member 104 is inferred to be distressed (S565), then a distressed member alert may be generated and transmitted (S570) to a group steward for response. It may be beneficial to provide boundary conditions (S575) for alert notifications, which may be preset or empirically determined through observations of member 104 behavior.

Turning to FIG. 6, an embodiment of a breeding behavior inference analysis 600 is shown. As with method 500 in FIG. 5, method 600 may begin by detecting (S60S) group members 104 and a spatial distribution of group members, in an observation region, such as region 110 in FIG. 1. Present group members may be reviewed and checked (S610) for the presence of one or more sires in proximity to a dam. If so, it may be desirable to execute (S615) an embodiment of a wellness inference analysis technique, which may be similar to method 500 in FIG. 5. In an instance in which action S615 infers a distressed member state (S620), it may be desirable to notify (S625) a group steward to intervene and stop further breeding behavior by the identified dam. If the identified dam is not inferred to be distressed, it may be desirable to determine (S630) whether the identified dam has already engage in a potentially successful breeding behavior.

If it is determined that the identified dam has engaged in a potentially successful breeding behavior, then it may be assumed that the dam has conceived and breeding attempts will soon cease, and to continue to detect group member configurations (605). However, it may be desirable to track the frequency of recent breeding attempts with an identified dam, and to infer a distressed animal state for repetitive breeding behavior, similar to a previously described manner. On the other hand, if the identified dam has not engaged in recent breeding behavior, method 600 can include measure the time (S645) that an identified sire spends with the identified dam. In general, a suitable amount of time for a potentially successful breeding event can be determined. If a sire spends a suitable amount of time with an identified dam, then it is desirable to record (S660) the likely occurrence of a breeding event.

This information may be stored in a database (S640), which may be a breeding database. It also may be desirable to generate and transmit a status alert to a group steward indicating that a successful breeding may have occurred, and denoting the potential breeding pair. More than one sire may spend a suitable amount of time with a dam in estrus, and so, storing related information (S640) in a database may enable subsequent identification of a breeding pair, and thus a lineage of offspring. It is possible that contact between a sire and an identified dam is incidental (S655), if so, then it may be desirable to resume detecting (S605) a spatial distribution of group 102. If contact is not incidental, but is not considered to be suitable to infer a proper breeding time, then it may be beneficial to continue to monitor time spent by a sire with a receptive dam.

FIG. 7 illustrates an embodiment of a predation inference analysis technique 700, by which behavior indicative of the presence or activity of a predator may be determined and a distressed member state may be inferred. Technique 700 may be a separate technique, as indicated in FIG. 7, or may be subsumed by one or more functions corresponding to image processing (S410), neighbor detection (S430), spatial-behavioral mapping (S450), or behavioral analysis & wellness inference technique (S460). Similar to method 500 and method 600, method 700 may begin by detecting group members 104 and a spatial distribution of group members (S705). It may be beneficial to execute (S710) wellness inference analysis technique 500, or a functional equivalent thereof. When a distressed member state can be inferred (S715) from member behavior, it can be desirable to generate and transmit a distress alert (S720) to a group steward, indicating a distressed member from an inferred illness. If members appear to be in a well member state (S725), it can be advantageous to monitor member movement (S730).

In one embodiment of predation inference analysis technique 700, a distressed member state due to predation may be inferred (S735) when identified coordinated movements of a member 104, of proximate members, such as in group 112, 114, and of group 102, indicate rapid movement or concerted movement away from a common area of region 110. Where a distressed member state corresponding to predation can be inferred, it can be beneficial to generate (S740) a corresponding distress alert and to transmit the alert quickly to a group steward. An alternative to concerted group or subgroup movements may include an identifiable behavior of a single member, such as of distressed member 190, which may be used to infer activity of predator 175.

In view of the foregoing, apparatus and methods in accordance with the present disclosure can be applicable for use with virtually every species of social animal to identify a variance behavior in a member of the social group. A variance behavior may be determined as a function of the observed behavior of the member compared to member behavioral norms and expectations; as a function of an observed behavior of the member, compared to empirical group behavior, or group behavioral norms and expectations; as a function of a member behavior with respect to the environment in which the group is located; or as a function of a member behavior with respect to a presence or activity of a predator. In addition, apparatus and methods described herein may permit true social behaviors of a member, subgroup, or group to be observed and characterized. Moreover, apparatus and methods may permit rapid identification of, and intervention in, abnormal behavior among members of the social group.

The above described example embodiments of the present invention are intended as teaching examples only. These example embodiments are in no way intended to be exhaustive of the scope of the present invention.

What is claimed is:

1. A method comprising:
    receiving a plurality of signals from a plurality of passive tags coupled with each animal of a plurality of animals over a period of time, each signal comprising geospatial data;
    determining spatiotemporal distribution of the plurality of animals within an observation region over a period of time based on the geospatial data from each of the plurality of passive tags;
    determining a wellness state of a first animal of the plurality of animals based on the spatiotemporal distribution of the plurality of animals; and
    transmitting an alert in response to the wellness state.

2. The method according to claim 1, wherein the wellness state comprises a breeding state or a health state of the first animal.

3. The method according to claim 1, wherein determining the wellness state of the first animal includes determining the proximity of the first animal to a point or region of attraction within the observation region.

4. The method according to claim 1, wherein the point or region of attraction includes one or more of water, shade, swales, food, mineral supplements, and water supplements.

5. The method according to claim 1, wherein determining the wellness state of the first animal includes determining the proximity of the first animal to a point or region of repulsion within the observation region.

6. The method according to claim 1, wherein the point or region of repulsion includes one or more of mound, dips, unevenly illuminated areas, toxic plants, trees, washes, fences, and bluffs.

7. The method according to claim 1, wherein determining a wellness state of a first animal of the plurality of animals includes referencing a record database for data on the first animal of the plurality of animals.

8. A method comprising:
    receiving a plurality of signals from a plurality of passive tags coupled with each animal of a plurality of animals over a period of time, each signal comprising geospatial data;
    determining spatiotemporal distribution of the plurality of animals within an observation region over a period of time based on the geospatial data from each of the plurality of passive tags;
    determining a wellness state of a subset of animals of the plurality of animals based on the spatiotemporal distribution of the plurality of animals; and
    updating a record database that includes information about the plurality of animals with the wellness state of the subset of animals.

9. The method according to claim 8, wherein the record database includes one or more of the following: predetermined attributes of each animal, empirical observations about each animal, and biometric data about each animal.

10. The method according to claim 8, wherein the wellness state comprises a breeding state or a health state of the first animal.

11. The method according to claim 8, wherein determining the wellness state of the first animal includes determining the proximity of the first animal to a point or region of attraction within the observation region.

12. The method according to claim 8, wherein the point or region of attraction includes one or more of water, shade, swales, food, mineral supplements, and water supplements.

13. The method according to claim 8, wherein determining the wellness state of the first animal includes determining the proximity of the first animal to a point or region of repulsion within the observation region.

14. The method according to claim 8, wherein the point or region of repulsion includes one or more of mound, dips, unevenly illuminated areas, toxic plants, trees, washes, fences, and bluffs.

15. The method according to claim 8, wherein determining a wellness state of a first animal of the plurality of animals includes referencing a record database for data on the first animal of the plurality of animals.

16. A system comprising:
    a wireless input channel;
    a record database that includes information about the plurality of animals;
    a process communicatively coupled with the wireless input channel and the record database, the processor includes instructions to:
        receive a plurality of signals from a plurality of passive tags coupled with each animal of a plurality of animals over a period of time via the wireless input, each signal comprising geospatial data;
        determine spatiotemporal distribution of the plurality of animals within an observation region over a period of time based on the geospatial data from each of the plurality of passive tags;
        determine a wellness state of a subset of animals of the plurality of animals based on the spatiotemporal distribution of the plurality of animals; and
        updating the record database with the wellness state of the subset of animals.

17. The system according to claim 16, wherein determining the wellness state of the first animal includes determining the proximity of the first animal to a point or region of attraction within the observation region.

18. The system according to claim 16, wherein the point or region of attraction includes one or more of water, shade, swales, food, mineral supplements, and water supplements.

19. The system according to claim 16, wherein determining the wellness state of the first animal includes determining the proximity of the first animal to a point or region of repulsion within the observation region.

20. The system according to claim 16, wherein the point or region of repulsion includes one or more of mound, dips, unevenly illuminated areas, toxic plants, trees, washes, fences, and bluffs.

* * * * *